US008484180B2

(12) United States Patent
Dmitriev et al.

(10) Patent No.: US 8,484,180 B2
(45) Date of Patent: Jul. 9, 2013

(54) GRAPH-BASED SEED SELECTION ALGORITHM FOR WEB CRAWLERS

(75) Inventors: Pavel Dmitriev, Santa Clara, CA (US); Shuyi Zheng, State College, PA (US)

(73) Assignee: Yahoo! Inc., Sunnyvale, CA (US)

( * ) Notice: Subject to any disclaimer, the term of this patent is extended or adjusted under 35 U.S.C. 154(b) by 796 days.

(21) Appl. No.: 12/477,819

(22) Filed: Jun. 3, 2009

(65) Prior Publication Data

US 2010/0312774 A1    Dec. 9, 2010

(51) Int. Cl.
*G06F 17/30* (2006.01)

(52) U.S. Cl.
USPC .......................................... 707/706; 707/758

(58) Field of Classification Search
USPC .................................. 707/706, 758
See application file for complete search history.

(56) References Cited

U.S. PATENT DOCUMENTS

| 6,029,195 | A | 2/2000 | Herz |
| 6,237,006 | B1 | 5/2001 | Weinberg et al. |
| 6,278,992 | B1 | 8/2001 | Curtis et al. |
| 6,438,734 | B1 * | 8/2002 | Lu .................................. 716/106 |
| 2003/0033370 | A1 | 2/2003 | Trotta |
| 2004/0205076 | A1 | 10/2004 | Huang et al. |
| 2005/0177595 | A1 | 8/2005 | Krieg et al. |
| 2005/0192936 | A1 | 9/2005 | Meek et al. |
| 2005/0278288 | A1 | 12/2005 | Plow et al. |
| 2006/0271564 | A1 * | 11/2006 | Meng Muntz et al. ........ 707/100 |
| 2007/0214150 | A1 | 9/2007 | Chace et al. |
| 2008/0082481 | A1 * | 4/2008 | Joshi et al. ......................... 707/2 |
| 2008/0097941 | A1 * | 4/2008 | Agarwal .......................... 706/12 |
| 2008/0313119 | A1 * | 12/2008 | Leskovec et al. ............... 706/46 |

OTHER PUBLICATIONS

Chakrabarti et al., "Accelerated Focused Crawling through Online Relevance Feedback" May 7, 2002, ACM 1-58113-449-5/02/0005, pp. 148-159.
U.S. Appl. No. 11/855,962, filed Sep. 14, 2007, Final Office Action, May 19, 2010.
U.S. Appl. No. 11/855,962, filed Sep. 14, 2007, Advisory Action, Jun. 25, 2010.

* cited by examiner

*Primary Examiner* — Son T Hoang
(74) *Attorney, Agent, or Firm* — Hickman Palermo Truong Becker Bingham Wong LLP; Edward A. Becker

(57) ABSTRACT

One or more search seeds for Web crawling operations are selected. In a directed graph with Web pages represented by vertices and links represented by edges, characteristics of vertices connected to potential seed vertices are considered in making a seed selection.

28 Claims, 6 Drawing Sheets

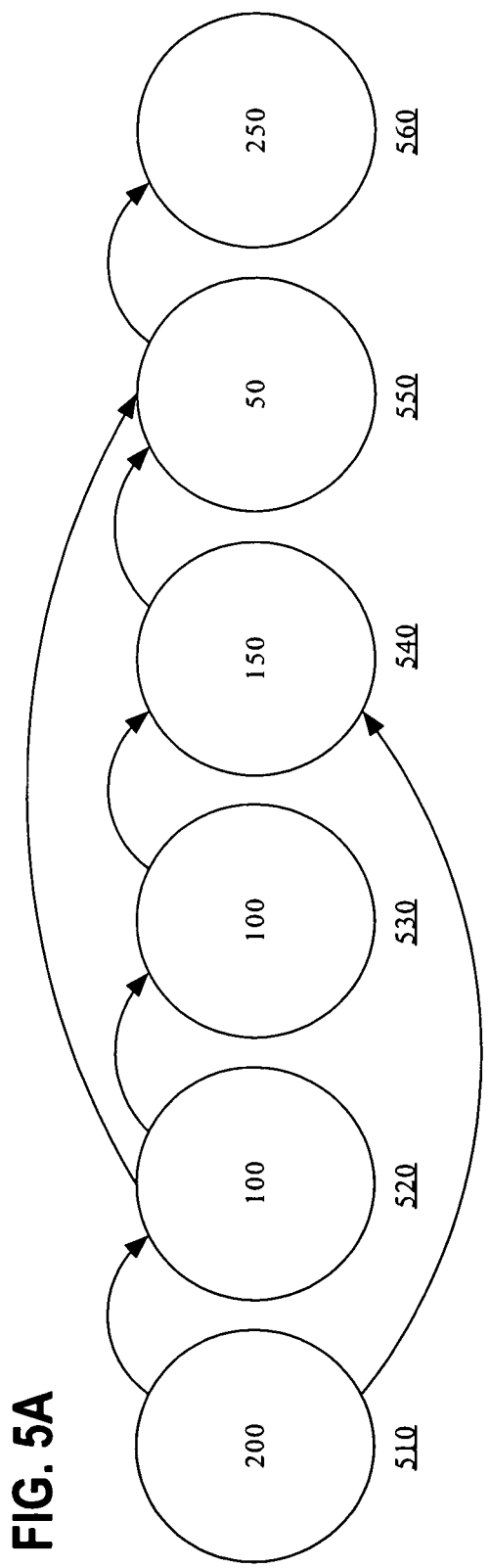
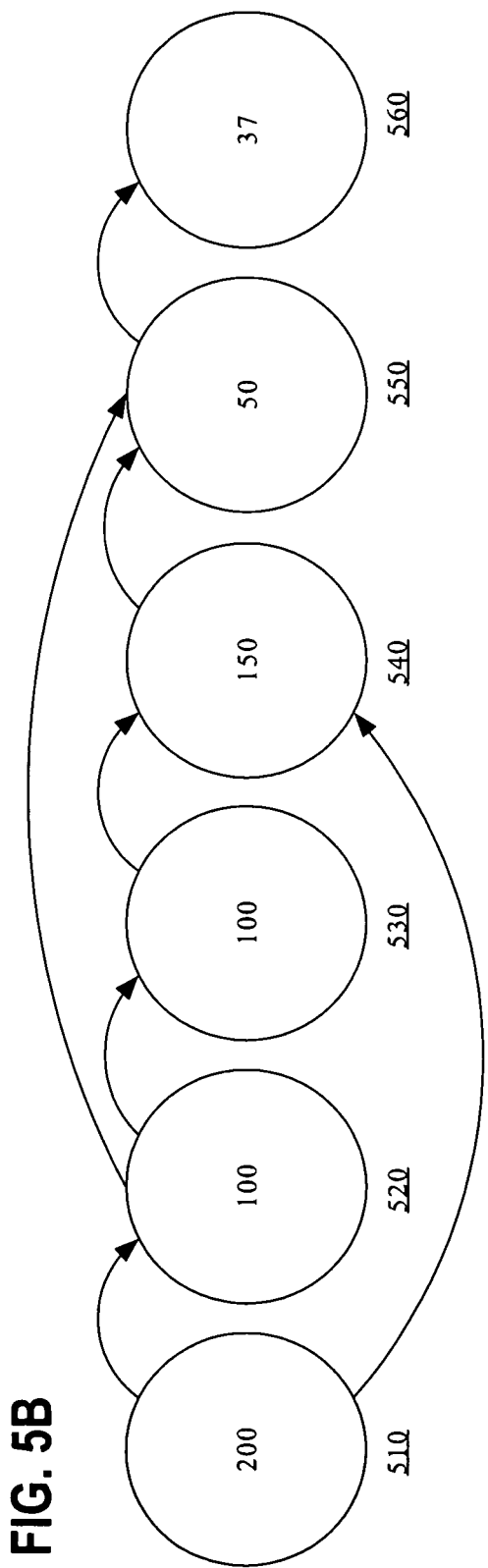
FIG. 5A
FIG. 5B

GRAPH-BASED SEED SELECTION ALGORITHM FOR WEB CRAWLERS

FIELD OF THE INVENTION

The present invention relates to web crawling technology. In particular, the present invention relates to seed selection technology for web crawlers.

BACKGROUND

World Wide Web-General

The Internet is a worldwide system of computer networks and is a public, self-sustaining facility that is accessible to tens of millions of people worldwide. The most widely used part of the Internet is the World Wide Web, often abbreviated "WWW" or simply referred to as just "the Web". The Web is an Internet service that organizes information through the use of hypermedia. The HyperText Markup Language ("HTML") is typically used to specify the contents and format of a hypermedia document (e.g., a Web page).

In this context, an HTML file is a file that contains the source code for a particular Web page. A Web page is the image or collection of images that is displayed to a user when a particular HTML file is rendered by a browser application program. Unless specifically stated, an electronic or Web document may refer to either the source code for a particular Web page or the Web page itself. Each page can contain embedded references to images, audio, video or other Web documents. The most common type of reference used to identify and locate resources on the Internet is the Uniform Resource Locator, or URL. In the context of the Web, a user, using a Web browser, browses for information by following references that are embedded in each of the documents. The HyperText Transfer Protocol ("HTTP") is the most common protocol used to access a Web document and the references that are based on HTTP are referred to as hyperlinks (formerly, "hypertext links").

Search Engines

Through the use of the Web, individuals have access to millions of pages of information. However, a significant drawback with using the Web is that because there is so little organization to the Web, at times it can be extremely difficult for users to locate the particular pages that contain the information that is of interest to them. To address this problem, a mechanism known as a "search engine" has been developed to index a large number of Web pages and to provide an interface that can be used to search the indexed information by entering certain words or phases to be queried. These search terms are often referred to as "keywords".

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate Web documents. Upon locating a document, the crawler may take any number of actions, depending on the configuration of the crawler. In some cases, the crawler stores the document's URL, and follows any hyperlinks associated with the document to locate other Web documents. Second, each search engine contains an indexing mechanism that indexes certain information about the documents that were located by the crawler. In general, index information is generated based on the contents of the HTML file associated with the document. The indexing mechanism stores the index information in large databases that can typically hold an enormous amount of information. Third, each search engine provides a search tool that allows users, through a user interface, to search the databases in order to locate specific documents, and their locations on the Web (e.g., a URL), that contain information that is of interest to them.

Crawlers

The quality of the documents or Web pages available to users via a search system is directly impacted by the crawler configuration. Large search providers often have multiple crawlers operating simultaneously. Each crawler may have unique logic, as well as multiple configuration options determining the context, duration, and goals of the crawl.

One configuration option is the starting page, or a "seed." This setting represents the page from which a crawler will begin crawling the web. For example, if the seed is set to the "flickr" home page at www.flickr.com, then the crawler will begin the crawling operation at that page, following links found on that page.

Another configuration option defines the depth, degree, or number of levels of crawling. For example, a crawler may be configured to crawl Web pages or documents that are within ten links, or "hops," away from the seed page. This ensures a certain proximity to the seed page. Likewise, a crawler may be configured to crawl only within the domain of the seed page.

A different configuration may specify that a crawler crawl only within a certain number of domains away from the seed page domain. In this context, a domain represents a set of documents available via URLs residing under a common Internet domain name. For example, the URLs http://www-.flickr.com/photos/ and http://www.flickr.com/tour/ can be said to reside in the same domain, because they share a common Internet domain name: www.flickr.com. Portions of the domain name may be ignored if the crawler is configured to do so. For example, the "www" portion of the domain name may be ignored, so that http://flickr.com/photos/ and http://www.flickr.com/tour/ can be said to reside in the same domain. A domain that is accessible via one link from the seed page domain may be said to be a first degree domain of the seed domain. Likewise, a domain that is directly accessible from a first degree domain may be said to be a second degree domain, and so on. In this scenario, a crawler may recognize that the domain links directly to pages in several first degree domains, which in turn link to pages in second degree domains. A crawler may be configured to crawl only $1^{st}$ through $n^{th}$ degree domains.

Crawlers are often configured with logic that allows them to recognize and respond to undesirable circumstances. For example, a crawler may recognize that it is crawling an infinite path. Infinite paths are often created by dynamic website generation scripts, such as calendar applications, where following each link to the next year infinitely creates new calendars representing each subsequent year. A crawler in this situation will often revert back to a page that has a known quality, and continue the operation while avoiding the infinite path.

Crawlers often employ dynamic logic, enabling the crawler to adjust crawling preferences. For example, crawlers often adjust the above configurations based on user feedback, changes in system configuration, structure and quality of websites, and business priorities.

Seed Selection

The infinite path scenario provides just one example of why crawlers with less than infinite resources must be configured to find quality information, rather than pure quantity. For this reason, the seed at which the crawling operation is started is crucial. Also, pages closest to the seed often get updated more frequently, increasing the importance of seed selection.

Seed selection is currently performed in several ways. The four most popular methods are: random seed selection, manual seed selection, specialized seed selection, and seed selection based upon characteristics of the potential seed page.

Random seed selection techniques are based on the goal of crawling every available Web document. The logic follows from the assumption that all pages are connected and every page will be crawled at some point, so the starting point does not matter.

Manual seed selection relies on a human determination of quality. Popular home pages such as news outlets or other media sites such as "portals" are chosen, as they have perceived quality and link to large amounts of content.

Specialized seed selection is similar to manual seed selection, but is more focused. A crawler with a goal of indexing Web pages related to the automotive industry may be configured by an administrator to start the crawl at a well-known automotive industry related website. The logic behind this selection is that the website, when used as a seed, will probably yield content from other sites related to the automotive industry.

There is a potential problem with the manual and specialized methods. Popular sites often fail to produce a path to other popular sites. For example, using a popular computer manufacturer website as a seed will usually fail to lead a crawler to another popular computer manufacturer within a reasonable degree of link traversal.

More advanced methods of seed selection take into consideration characteristics of the potential seed. Each Web page, or potential seed, is analyzed to determine the number of inlinks to the page representing the number of links from other Web pages to the potential seed, outlinks from the page representing the number of links from the potential seed to other Web pages, or other quality determination associated with the potential seed. Other quality determinations may be made based on user activity associated with the Web page, search engine ranking, or other search-related data.

Even the advanced methods of seed selection may have undesirable side-effects. For example, many low-quality websites have a large number of outlinks by their very nature, or in an attempt to "spam" search engines. Likewise, Web pages that have a large number of inlinks are often quality pages, or "destination pages" rather than Web pages having paths to many quality pages. Additionally, if multiple seeds are chosen for multiple crawling operations and those seeds link to each other within a few hops, resources are wasted as each crawler has an overlapping territory, since each seed has an overlapping territory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A is a diagram illustrating a directed graph, representing relationships between strongly connected components, for which an embodiment may be implemented.

FIG. 5B is a diagram illustrating a directed graph, representing relationships between strongly connected components, for which an embodiment may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a web graph comprises a directed graph with web pages as vertices and links as edges. A quality metric is determined for a plurality of vertices. The vertex quality metric measures the ability of a vertex to facilitate discovery of web pages, and is based in part on attributes of vertices to which the vertex is connected. A web crawling starting seed is determined based on the quality metrics. A web crawling operation is performed based on the starting seed.

In another embodiment, a plurality of strongly connected components is determined based on a web graph. A strongly connected component is a set of vertices in a directed graph, where for every pair of vertices in a strongly connected component, there is a path from each vertex to the other. A quality metric is determined for each strongly connected component. The quality metric measures the ability of a strongly connected component to facilitate discovery of web pages. Based on the quality metrics, a strongly connected component is selected. A vertex in the selected strongly connected component is selected to be a starting seed. A web crawling operation is performed based on the starting seed.

Structural and Functional Overview

Figure 1:
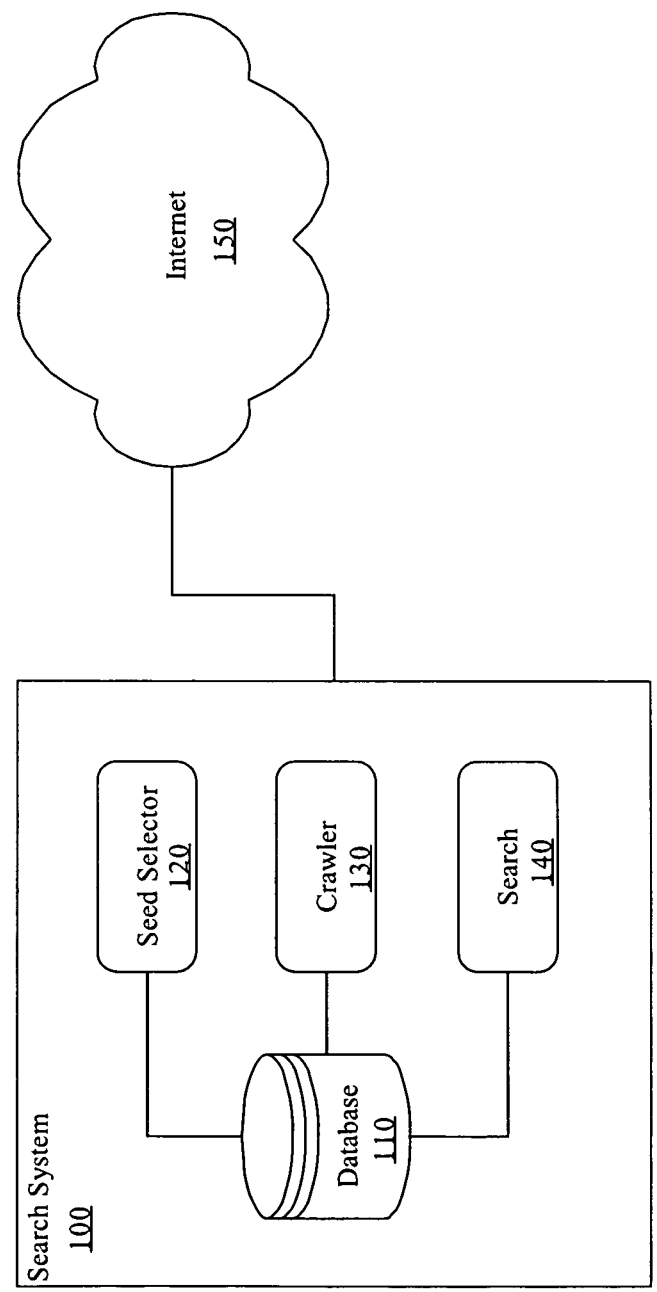
FIG. 1 is a diagram illustrating an architecture on which an embodiment may be implemented.

FIG. 1 is a block diagram representing a system on which an embodiment may be utilized. Search system 100 is communicatively connected to Internet 150, and comprises Database 110, seed selector logic 120, crawler logic 130, and Search logic 140.

Seed selector 120, crawler 130, and search 140 are each communicatively coupled to Database 110. In an embodiment, seed selector 120, crawler 130, and search 140 are each communicatively coupled to one another.

Search system 100 may reside on one computing system. Alternatively, search system 100 may comprise multiple computing systems. Any logical portion of search system 100 may be separate from the other logical portions of search system 100. For example, separate computing systems may be used for seed selector 120, crawler 130, and search 140.

In an embodiment, seed selector 120, crawler 130, search 140, and Database 110 each reside at different physical locations. In another embodiment, seed selector 120, crawler 130, search 140, and Database 140 reside on a desktop computer or mobile computing device such as a smartphone or personal digital assistant.

Database 110 stores and retrieves data for use in crawling and search operations. Database 110 may be a relational database, multidimensional database, flat file, or any other structure capable of storing search related information such as text. A database management system (DBMS) may be used to manage the database. Alternatively, custom routines may be used to manage data.

Seed selector 120 selects a starting point, or a "seed" for a web crawling operation. The selection is made based on data found in Database 110. Seed selector may also store seed information in Database 110. Alternatively, seed selector may store seed information in a location other than Database 110. For example, seed information may be stored in volatile or non-volatile memory when seed selector 120 runs in the same process as crawler 130.

Crawler 130 performs a web crawling operation. More than one crawler program may be executed, and each crawler may use a different seed as a starting point. Alternatively, a single crawler may use more than one seed. Also, more than one crawler may share logic allowing the crawlers to divide the work of crawling based on a single seed. Thus, although the application may present a one-to-one seed-to-crawler ratio for the sake of convenience and clarity, there need not be a one-to-one crawler-to-seed ratio. Crawler 130 stores data gathered during a crawling operation in Database 110.

Search 140 accepts user input requesting matching items. Search 140 retrieves matching data from the database and returns the data to the requesting user.

Directed Graphs

The Internet consists of several logically separated portions. The portion most well known is the World Wide Web, often called "the Web." This terminology describes the vast number of interconnected Web pages and their interconnections. A single page may link to many pages. Likewise, many pages may link to a single page.

Figure 2:
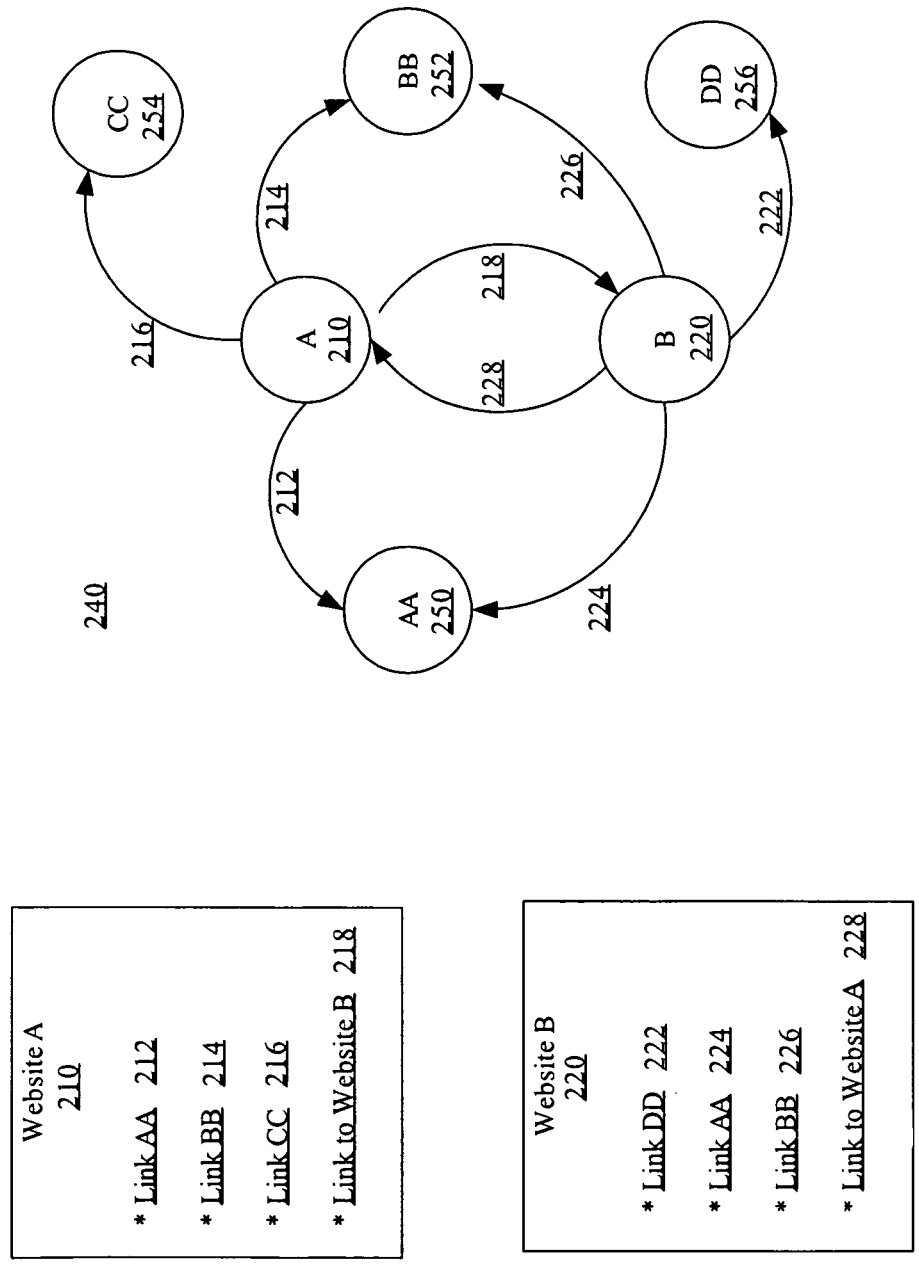
FIG. 2 is a diagram illustrating an example of a directed graph that represents relationships between Web pages.

Directed graphs provide a means for organizing and visualizing the Web at the same time. FIG. 2 shows a directed graph that represents several web pages and their interconnecting links.

Website A 210 contains links AA 212, BB 214, CC 216, and a link to Website B 218. Website B 220 contains links DD 222, AA 224, BB 226, and a link to Website A. Websites AA 250, BB 252, CC 254, and DD 256 are not shown, but are represented in graph 240.

Graph 240 shows the relationships between the websites. Each website is represented by a vertex of the graph, and each link is represented by an edge of the graph. For example, vertex 210 represents Website A 210. Edge 212 represents the link from Website A 210 to Website AA 250. Likewise, vertex 220 represents website B, while edge 226 represents the link from Website B 220 to Website BB 252. Links 212-218 are represented by edges 212-218, while links 222-228 are represented by edges 222-228.

This application will use convenient terminology to describe the use and traversal of a directed graph. Each link will be referred to as a "hop," so that the distance between vertices in a directed graph may be understood. For example, the distance between Website A 210 and Website DD 256 can be said to be two hops. Another way of determining the number of hops measuring the distance between two vertices is to count the number of edges separating the two vertices. If there are multiple paths connecting two vertices, a path having the minimal number of edges should be used as a measure of distance.

The term "level" may be used to describe each vertex at a specified number of hops from the starting point of a graph. The level may also be described or implied to be inclusive, in order to include intervening levels.

Seed Selection

A good quality seed is a seed that will lead, in some number of hops, to the most high-quality pages.

The number of hops is a parameter configured in the seed selection logic. Another parameter configured in seed selection logic is the number of seeds. The configuration may be manual or automatic. These parameters are based, at least partially, on available system resources such as processor and memory usage.

Web pages may be measured by any quality metric available. Seed selector 120 does not require a particular definition of quality to operate. For example, a Web page that has been returned in a set of search results, thereafter being selected by the user, may be considered a high-quality page. Another measurement of quality is the number of links the page has to other pages that have not been crawled before. The opportunity to gather new content may command a higher quality metric than web pages with links to known data.

Characteristics affecting quality may be considered independently of one another, and weighted differently depending on their location on the graph or proximity to the potential seed. In an embodiment, however, characteristics may be pooled together into a quality metric representing the quality of the Web page represented by a vertex. Any method of determining quality may be used.

Two distinct seed selection methods are described hereafter. Each seed selection method has alternative embodiments that provide additional features.

Directed Graph-Based Seed Selection

The first method of seed selection is based on a directed graph of the Web. Unlike prior methods of seed selection, which take into consideration only properties of the potential seed, the directed graph based seed selection technique takes into consideration the characteristics of pages in the same "neighborhood" as the potential seed.

"Neighborhood" is a way to describe a set of vertices in a directed graph, and represents a group of vertices that lie on the graph within a number of hops defined for that neighborhood. For example, a neighborhood may be defined with a two-hop radius. In this example, a potential seed is selected. The characteristics of those vertices within one hop are considered. Likewise, the characteristics of those vertices within two hops are considered. Based on the considered characteristics of the vertices in the neighborhood, seed selector 120 makes a determination as to whether the vertex is a desirable seed.

A neighborhood may be defined in other ways if desired by the operator. For example, an operator may choose to consider only the characteristics of pages that are more than one hop away, or exactly three hops away. As long as characteristics of vertices representing Web pages other than the potential seed itself are considered, a more desirable seed may be chosen.

In the following example, a quality determination for each vertex, based on information known to search system 100, exists prior to seed selection. To simplify the example, the quality metric is based solely on the number of inlinks to the vertex being quantified. Thus, if a Web page is linked to by three other Web pages, the vertex representing that Web page in this example has a vertex quality metric of three.

Figure 3:
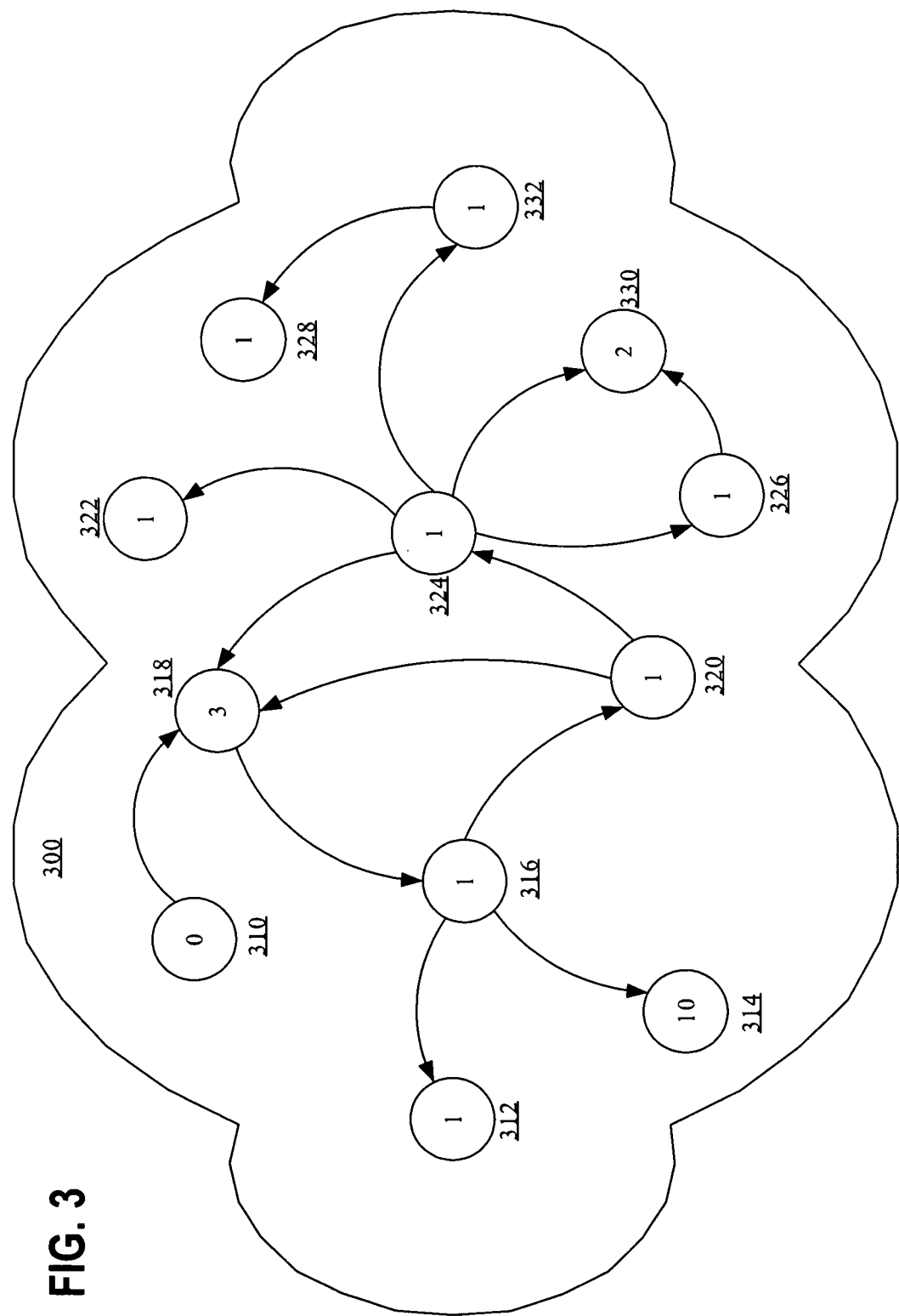
FIG. 3 is a diagram illustrating an example directed graph for which an embodiment may be used.

FIG. 3 illustrates a directed graph 300 containing vertices 310-332. Each quality determination is shown inside each respective vertex in FIG. 3. In an embodiment, each potential seed is ranked against all other potential seeds in an effort to determine which potential seed to use. Each vertex is a potential seed, and is assigned a "seed score" that represents the ability of the seed to facilitate the finding of quality Web pages. In this example, the seed score represents the total of all vertex quality metrics within the specified number of hops of the potential seed. The number of hops that will be used in this example is one.

For example, vertex 324 has five edges representing outlinks, and therefore has five vertices within a one-hop radius. Vertex 324 links to vertices 318, 322, 332, 330, and 326, having vertex quality scores of 3, 1, 1, 2, and 1, respectively. Adding these scores, along with the quality score of vertex 324 (1) results in a total seed score of 9. The same operation is carried out for each vertex in the graph, leading to the following table of seed scores:

TABLE 1

| Vertex | Seed Score |
|---|---|
| 310 | 3 |
| 312 | 1 |
| 314 | 10 |
| 316 | 13 |
| 318 | 4 |
| 320 | 5 |
| 322 | 1 |
| 324 | 9 |
| 326 | 3 |
| 328 | 1 |
| 330 | 2 |
| 332 | 2 |

As can be seen in Table 1, the potential seed with the highest seed score is vertex 316, with a score of 13. Vertex 314 has a high vertex quality metric, surpassing other metrics. Although vertex 324 has the most outlinks, and vertex 314 has the most inlinks (not shown, but represented by the quality metric of 10), neither of these vertices has been chosen as the best seed. By taking into consideration properties of neighboring vertices, a seed is chosen that will result in a higher overall crawl quality.

The best seed determination depends on the number of hops configured. The example above might have led to a different result if the number of hops were set to a higher number.

A noticeable side-effect of increasing the hop count to two is a double-counting anomaly. Vertex 324 has an edge to vertex 326, which has an edge to vertex 330. But vertex 324 also has an edge to vertex 330. However, seed selector 120 may be configured with logic that detects such loops and reduces the seed score accordingly.

Although the previous example discusses a single seed selection, multiple seeds may be desirable. For example, a high-capacity search system 100 may be capable of running many crawlers concurrently.

When selecting multiple seeds, choosing seeds that are too close in proximity to one another on a directed graph leads to wasted resources. For example, if the hop count is set to two, and two seeds are desired, choosing vertex 316 as a first seed and 318 as a second seed would be counter-productive. This choice would lead to a large overlap in the Web pages crawled, since all but one of the vertices covered by a crawl using the first seed will also be covered by a crawl initiated using the second seed.

Seed selection may take place all at once, or in a sequence. In an embodiment, each seed selection requires a recalculation of the vertex quality values in the directed graph, taking into consideration the coverage of a crawl that will be initiated by previously determined seeds. For example, once a first seed is chosen, all vertices expected to be covered by a crawl initiated using the first seed as a starting point may have their vertex quality metric reduced or set to zero.

Using graph 300 FIG. 3 to illustrate, a seed selection process selecting three seeds for a one-hop crawl radius is shown below:

TABLE 2

| Vertex | Seed Score - 1 | Seed Score - 2 | Seed Score - 3 |
|---|---|---|---|
| 310 | 3 | 3 | 0 |
| 312 | 1 | 0 | 0 |
| 314 | 10 | 0 | 0 |
| 316 | 13 | 0 | 0 |
| 318 | 4 | 3 | 0 |
| 320 | 5 | 1 | 0 |
| 322 | 1 | 1 | 0 |
| 324 | 9 | 9 | 0 |
| 326 | 3 | 3 | 0 |
| 328 | 1 | 1 | 1 |
| 330 | 2 | 2 | 0 |
| 332 | 2 | 2 | 1 |

Table 2 shows three seed selection operations taking place one after another. The first seed, vertex 316, is selected. Following this selection, all vertices expected to be crawled, or those vertices within one hop of the seed, are given a new vertex quality metric of zero. Seed selector 120 performs the seed selection operation again, basing the selection on the new values assigned to affected vertices, as well as the values of unchanged vertices.

Vertex 324 wins the selection process for the second seed, as its seed quality metric remained unchanged after the first operation, leaving vertex 324 to have the highest probability of leading a crawler to the most valuable content based on our definition of high quality content.

By the time the third iteration of seed selection begins, only two vertices remain. Vertex 328 remains with a vertex quality score of 1, and vertex 310 remains with a vertex quality score of zero. Vertices 328 and 332 have an equivalent seed score, because they will both result in the crawling process reaching vertex 328 within one hop. A tie-breaking mechanism, such as a determination of resources required to finish the crawl or a random selection agent may be used to decide between two potential seeds with equivalent quality values.

There may also be a situation where a zeroed-out vertex will have the highest seed score. For example, if the vertex was included on the outer edge of the crawling territory defined by a previous seed, that is to say that the vertex resides at the last hop available to the crawler, it may be the case that a seed with a quality score of zero is one hop away from several high-quality vertices.

Directed Graph Approximation

Given enough resources, directed graph based seed selection may be performed on a directed graph representing the entire Internet, or a portion thereof. Even infinite paths may be represented by a terminal vertex with a vertex quality score representative of the quality of the entire infinite path; such paths have diminishing returns. However, not every organization is capable of dedicating the resources required to perform seed selection on large quantities of data. This lack of resources becomes apparent as the number of seeds and the number of hops required increases. Calculation of a seed score for 20 hops, for example, could require the consideration of millions of vertices. Thus, a method of approximating the quality of a potential seed may make more sense for some organizations.

One way to approximate a seed score for a seed candidate is to consider a smaller neighborhood. In one embodiment, for example, even when the hop count is set to ten, the seed score for a potential seed is to be determined based only on those vertices within 2 hops or any other radius smaller than ten hops.

In an embodiment, other approximation methods are used. These approximation methods may take into consideration a subset of the selected neighborhood in different ways. Alternatively, approximation methods consider the global structure of the graph. For example, strongly connected components are to be considered in an embodiment.

Strongly Connected Components

In the context of a directed graph, a strongly connected component is defined by its properties: For every pair of vertices in a strongly connected component, there is a path from each vertex to the other. A strongly connected component includes as many vertices as possible. Therefore, although a strongly connected component cannot be said to be made up of smaller strongly connected components, even though a smaller set of vertices within the strongly connected component may, for each pair of vertices, have a path from each vertex to the other. This set would only be considered to be a strongly connected set of vertices. Only when a set of vertices is at a maximum of strongly connected vertices can the set be considered a strongly connected component.

Figure 4:
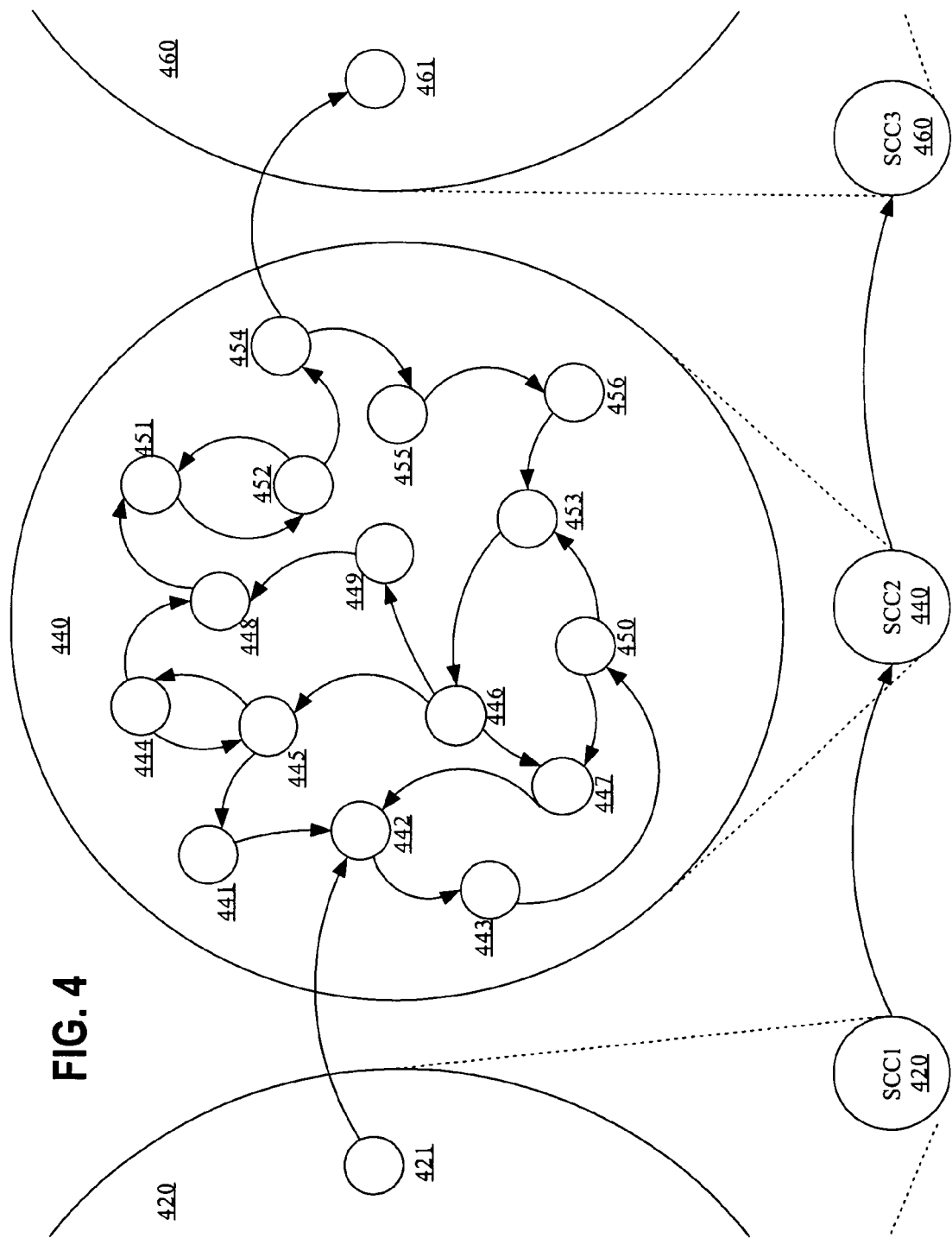
FIG. 4 is a diagram illustrating an example strongly connected component having a directed graph, for which an embodiment may be used.

FIG. 4 is a diagram showing three separate strongly connected components in a string of strongly connected components. Strongly connected component SCC1 420 is connected to strongly connected component SCC2 440, which is in turn connected to strongly connected component SCC3 460. In this way, SCC1 420, SCC2 440, and SCC3 460 are represented as a "parent" or "super" directed graph, each strongly connected component containing a sub-graph or child graph.

An expanded view of SCC2 440 is shown in FIG. 4. True to the definition of a strongly connected component, there exists a path from each vertex 441-456 to each other vertex 441-456. For example, a path from vertex 441 to vertex 455 exists as follows: vertex 441—vertex 442—vertex 443—vertex 450—vertex 453—vertex 446—vertex 44—vertex 448—vertex 451—vertex 452—vertex 454—vertex 455.

Vertex 421 is not part of SCC2 440 because there is no path back to vertex 421 once SCC2 440 is entered. This would violate the definition of a strongly connected component. Likewise, vertex 461 in not part of SCC2 440, because although there exists a path to vertex 461 from SCC2 440 via vertex 454, there is no path returning to SCC2 440 once SCC3 460 is reached.

Strongly connected components form "chains" that may be represented by a directed graph. These chains may interconnect with one another, or may exist as a single chain such as the chain shown is FIG. 4. These chains may be connected with any number of connecting components. However, any directed loop in a chain of strongly connected components redefines the set of strongly connected components in the loop as a single strongly connected component. This is because a loop of strongly connected components creates a path from each vertex in the loop to each other vertex in the loop. Therefore, a chain of properly defined strongly connected components does not form a loop.

Strongly Connected Component-Based Seed Selection

Strongly connected components assist in providing an approximation of quality for a portion of a directed graph such as a Web graph.

A strongly connected component may be assigned a component quality metric based any criteria available. In an embodiment, a quality metric is assigned by summing up the vertex quality values of the vertices contained in the strongly connected component.

Once a quality metric has been assigned to each strongly connected component, the strongly connected component with the highest component quality value may be selected as the component from which a seed should be selected. The highly interconnected nature of a strongly connected component suggests that any vertex chosen within the component will result in the coverage of a large portion of the vertices in the component. That is to say any vertex that resides in SCC2 440, if chosen as a seed, will lead to a large portion of the other vertices in the component within a certain number of hops. Thus, an expectation of quality may be approximated.

In an embodiment, directed graph based seed selection may be used to select a vertex within the selected strongly connected component to be used as the seed. Alternatively, other simpler methods may be used to select the vertex. For example, the vertex with the highest number of outlinks may be selected as the seed.

Since multiple seeds are often desirable, the strongly connected components may employ a technique of selecting seeds similar to the technique used in the graph based seed selection method discussed above. In an embodiment, seed selector 120 determines which vertices will be visited by a crawler when a crawling operation is performed based on a first seed. Those vertices are then assigned a reduced vertex quality metric. The reduction of the vertex quality metrics in turn causes a reduction in the component quality metrics of components having vertices with reduced metrics. Since a path may exist from one strongly connected component to another within the number of hops specified in a crawling operation, many strongly connected components may be affected by a crawl, even though the crawl may have started in a particular strongly connected component.

FIG. 5A is a diagram illustrating a directed graph of strongly connected components. Each edge represents a connection from a vertex in one strongly connected component to a vertex in the next strongly connected component. Although strongly connected components 510-560 are shown in sequence with no intervening chains, intervening component chains are possible.

In an embodiment illustrated in FIG. 5A, strongly connected component 560 has the highest quality value, represented by the number inside the vertex on the graph. In this case, strongly connected component 560 has a component quality metric of 250. Strongly connected component 560 is chosen as the component from which to choose a vertex to be a seed. Before selecting a second strongly connected component from which to select a second seed, it is determined that vertices with a sum total vertex quality metric of 213 will be visited by the crawler. Thus, FIG. 5B shows a reduced value of 37 for strongly connected component 560. An advantage of this method is that only the values of affected strongly connected components need be changed.

In this example, however, no other strongly connected components were affected by the crawl. This may occur for at least two reasons. First, the hop count may be low enough that the edge of the strongly connected component cannot be reached by the crawl. Second, the strongly connected component itself is an "edge component" that is the final strongly connected component in a chain of strongly connected components. In FIG. 5A, there is no path from strongly connected component 560 to any other strongly connected component.

To avoid choosing an "edge component," an additional step may be used to determine the radius of a crawling operation. If crawling paths are cut significantly short, another strongly connected component may be chosen.

In another embodiment, strongly connected component directed graphs may employ the techniques discussed with respect to directed graph based seed selection to select a strongly connected component. For example, quality values strongly connected components within proximity of a strongly connected component may be considered when determining which strongly connected component to choose a seed from.

For example, strongly connected component 540 may be chosen if the hop count is high enough to cause the crawling operation to visit strongly connected component 560, the highest scoring component.

In another embodiment, a score of a particular strongly connected component may be increased based on the scores of strongly connected components that are reachable from the particular strongly connected component.

In another embodiment, a seed may be chosen based on a score of at least two strongly connected components in which the vertices reached from the seed lie.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
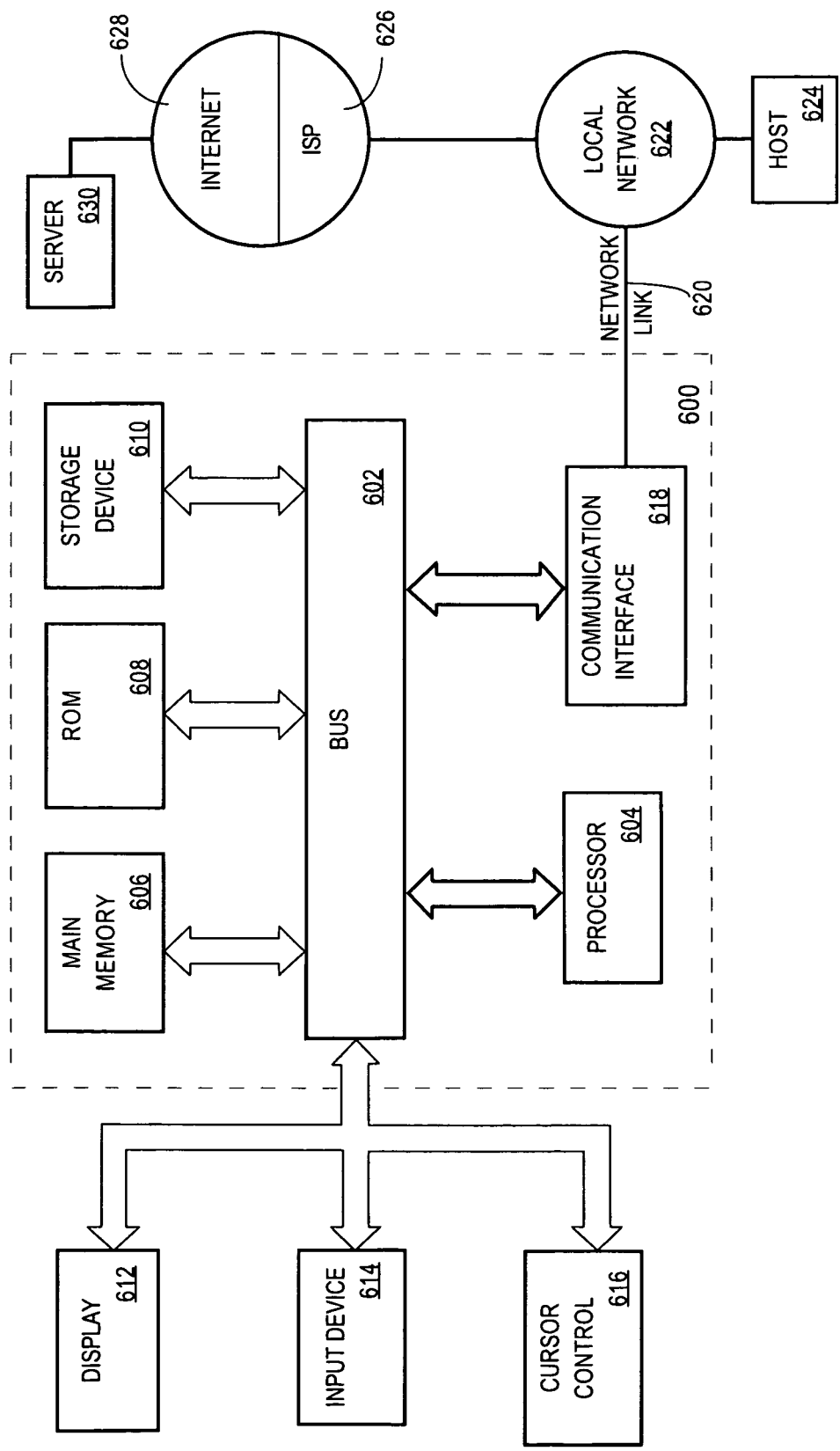
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method of selecting a seed for a web crawler, comprising:
    selecting, from a web graph, a plurality of vertices;
    wherein the web graph comprises a directed graph with web pages as vertices and links as edges;
    for each vertex of the plurality of vertices, determining one or more vertex quality metrics, wherein a vertex quality metric measures the ability of a vertex to facilitate discovery of web pages;
    wherein the one or more vertex quality metrics for a particular vertex is based in part on attributes of one or more vertices to which the particular vertex is connected via one or more edges;
    based on the vertex quality metrics, determining a first vertex from the plurality of vertices to be a first web crawler starting seed;
    based on the first web crawler starting seed, initiating a first crawling operation;
    determining a first set of all to-be-crawled vertices that (a) are within a specified number of hops away from a the first vertex selected as the first web crawler starting seed and therefore (b) are all of the vertices that are expected to be crawled by a the web crawler during the first web crawling operation; and
    modifying the vertex quality metric of each vertex within the first set of all to-be-crawled vertices;
    wherein the method is performed by one or more computing devices.

2. The computer-implemented method of claim 1, further comprising:
    based on vertex quality metrics of both (1) vertices whose vertex quality metrics were modified due to the modifying and (2) vertices whose vertex quality metrics were not modified due to the modifying, determining the second web crawler starting seed after performance of the modifying; and
    based on the second web crawler starting seed, performing a second web crawling operation.

3. The computer-implemented method of claim 1, wherein the one or more vertex quality metrics for a particular vertex is based in part on attributes of all vertices to which the particular vertex is connected via one or more edges within a specified number of hops.

4. The computer-implemented method of claim 1, wherein a quality metric for a vertex is based on one or more of the following:
    a) a number of outgoing connections to other vertices;
    b) a number of incoming connections to other vertices;
    c) a number of vertices within a predetermined number of levels of the vertex; or
    d) information derived from search engine statistics.

5. The computer-implemented method of claim 1, wherein initiating the first crawling operation comprises initiating an operation in which, for each particular vertex in the first set of all to-be-crawled vertices, the web crawler stores, in an index, index information that is generated based on contents of a Hypertext Markup Language (HTML) file that is associated with the particular vertex.

6. The computer-implemented method of claim 1, further comprising:
based on vertex quality metrics of both (1) vertices whose vertex quality metrics were reduced to zero due to the modifying and (2) vertices whose vertex quality metrics are non-zero, determining a second vertex to be a second web crawler starting seed after performance of the modifying; and
based on the second web crawler starting seed, performing a second web crawling operation;
wherein modifying the vertex quality metric of each vertex within the first set of to-be-crawled vertices comprises reducing the vertex quality metric of each vertex within the first set of to-be-crawled vertices to zero.

7. A computer-implemented method of selecting a seed for a web crawler, comprising:
determining, based on a web graph, a plurality of strongly connected components;
wherein the web graph comprises a directed graph with web pages as vertices and links as edges;
wherein each strongly connected component from the plurality of strongly connected components comprises a unique set of vertices, in the web graph, in which a path exists between each vertex in the set of vertices to each other vertex in the set of vertices;
determining a component quality metric for each strongly connected component from the plurality of strongly connected components, wherein a component quality metric measures the ability of a strongly connected component to facilitate discovery of web pages;
based on the component quality metric determination, selecting a first strongly connected component from the plurality of strongly connected components;
selecting a vertex within the first strongly connected component to be a first web crawler starting seed; and
based on the first web crawler starting seed, initiating a first crawling operation,
wherein the method is performed by one or more computing devices.

8. The computer-implemented method of claim 7, wherein the step of selecting a first web crawler starting seed comprises:
for the first strongly connected component, determining one or more vertex quality metrics for a plurality of vertices in the first strongly connected component, wherein a vertex quality metric measures the ability of a vertex to facilitate discovery of web pages;
based on the vertex quality metrics, determining the first web crawler starting seed.

9. The computer-implemented method of claim 7, further comprising:
based on the first web crawler starting seed, determining a set of vertices included in the first web crawling operation; and
based on the included set of vertices, reducing the component quality metric for the one or more strongly connected components.

10. The computer-implemented method of claim 7, further comprising:
based on the first web crawler starting seed, determining a set of vertices included in the first web crawling operation; and
reducing the quality metric for each vertex in the set of vertices.

11. The computer-implemented method of claim 10, further comprising:
based on the vertex quality metric reduction, reducing the component quality metric for each strongly connected component associated with a vertex in the set of vertices.

12. The computer-implemented method of claim 11, further comprising:
based on one or more component quality metrics, selecting a second strongly connected component;
selecting a vertex within the second strongly connected component to be a second web crawler starting seed;
based on the second web crawler starting seed, performing a second web crawling operation.

13. The computer-implemented method of claim 12, wherein the first strongly connected component and the second strongly connected component are the same strongly connected component.

14. The computer-implemented method of claim 7, wherein a component quality metric is based at least in part on attributes of vertices associated with the particular strongly connected component.

15. A non-transitory computer-readable medium storing instructions which, when processed by one or more computer processors causes:
selecting, from a web graph, a plurality of vertices;
wherein the web graph comprises a directed graph with web pages as vertices and links as edges;
for each vertex of the plurality of vertices, determining one or more vertex quality metrics,
wherein a vertex quality metric measures the ability of a vertex to facilitate discovery of web pages;
wherein the one or more vertex quality metrics for a particular vertex is based in part on attributes of one or more vertices to which the particular vertex is connected via one or more edges;
based on the vertex quality metrics, determining a first vertex from the plurality of vertices to be a first web crawler starting seed;
based on the first web crawler starting seed, initiating a first crawling operation;
determining a first set of all to-be-crawled vertices that (a) are within a specified number of hops away from a the first vertex selected as the first web crawler starting seed and therefore (b) are all of the vertices that are expected to be crawled by a the web crawler during the first web crawling operation; and
modifying the vertex quality metric of each vertex within the first set of all to-be-crawled vertices;
wherein the method is performed by one or more computing devices.

16. The non-transitory computer-readable medium of claim 15, further comprising additional instructions which, when processed by the one or more computer processors, causes:
based on vertex quality metrics of both (1) vertices whose vertex quality metrics were modified due to the modifying and (2) vertices whose vertex quality metrics were not modified due to the modifying, determining the second web crawler starting seed after performance of the modifying; and
based on the second web crawler starting seed, performing a second web crawling operation.

17. The non-transitory computer-readable medium of claim 15, wherein the one or more vertex quality metrics for a particular vertex is based in part on attributes of all vertices to which the particular vertex is connected via one or more edges within a specified number of hops.

18. The non-transitory computer-readable medium of claim 15, wherein a quality metric for a vertex is based on one or more of the following:
   a) a number of outgoing connections to other vertices;
   b) a number of incoming connections to other vertices;
   c) a number of vertices within a predetermined number of levels of the vertex; or
   d) information derived from search engine statistics.

19. The non-transitory computer-readable medium of claim 15, wherein initiating the first crawling operation comprises initiating an operation in which, for each particular vertex in the first set of all to-be-crawled vertices, the web crawler stores, in an index, index information that is generated based on contents of a Hypertext Markup Language (HTML) file that is associated with the particular vertex.

20. The non-transitory computer-readable medium of claim 15, further comprising additional instructions which, when processed by the one or more computer processors, causes:
   based on vertex quality metrics of both (1) vertices whose vertex quality metrics were reduced to zero due to the modifying and (2) vertices whose vertex quality metrics are non-zero, determining a second vertex to be a second web crawler starting seed after performance of the modifying; and
   based on the second web crawler starting seed, performing a second web crawling operation;
   wherein modifying the vertex quality metric of each vertex within the first set of to-be-crawled vertices comprises reducing the vertex quality metric of each vertex within the first set of to-be-crawled vertices to zero.

21. A non-transitory computer-readable medium for selecting a seed for a web crawler, the non-transitory computer-readable medium storing instructions which, when processed by one or more computer processors, cause:
   determining, based on a web graph, a plurality of strongly connected components;
   wherein the web graph comprises a directed graph with web pages as vertices and links as edges;
   wherein each strongly connected component from the plurality of strongly connected components comprises a unique set of vertices, in the web graph, in which a path exists between each vertex in the set of vertices to each other vertex in the set of vertices;
   determining a component quality metric for each of the plurality of strongly connected components from the plurality of strongly connected components, wherein a component quality metric measures the ability of a strongly connected component to facilitate discovery of web pages;
   based on the component quality metric determination, selecting a first strongly connected component;
   selecting a vertex within the first strongly connected component to be a first web crawler starting seed; and
   based on the first web crawler starting seed, initiating a first crawling operation.

22. The non-transitory computer-readable medium of claim 21, wherein selecting a first web crawler starting seed comprises:
   for the first strongly connected component, determining one or more vertex quality metrics for a plurality of vertices in the first strongly connected component, wherein a vertex quality metric measures the ability of a vertex to facilitate discovery of web pages;
   based on the vertex quality metrics, determining the first web crawler starting seed.

23. The non-transitory computer-readable medium of claim 21, further comprising additional instructions which, when processed by the one or more computer processors, cause:
   based on the first web crawler starting seed, determining a set of vertices included in the first web crawling operation; and
   based on the included set of vertices, reducing the component quality metric for the one or more strongly connected components.

24. The non-transitory computer-readable medium of claim 21, further comprising additional instructions which, when processed by the one or more computer processors, cause:
   based on the first web crawler starting seed, determining a set of vertices included in the first web crawling operation; and
   reducing the quality metric for each vertex in the set of vertices.

25. The non-transitory computer-readable medium of claim 24, further comprising additional instructions which, when processed by the one or more computer processors, cause:
   based on the vertex quality metric reduction, reducing the component quality metric for each strongly connected component associated with a vertex in the set of vertices.

26. The non-transitory computer-readable medium of claim 25, further comprising additional instructions which, when processed by the one or more computer processors, cause:
   based on one or more component quality metrics, selecting a second strongly connected component;
   selecting a vertex within the second strongly connected component to be a second web crawler starting seed;
   based on the second web crawler starting seed, performing a second web crawling operation.

27. The non-transitory computer-readable medium of claim 26, wherein the first strongly connected component and the second strongly connected component are the same strongly connected component.

28. The non-transitory computer-readable medium of claim 21, wherein a component quality metric is based at least in part on attributes of vertices associated with the particular strongly connected component.

* * * * *